Sept. 17, 1968  G. E. GREGORY, JR., ET AL  3,401,497
SUPPORT FOR REINFORCING MEMBERS
Filed Feb. 26, 1964

INVENTORS
GEORGE E. GREGORY, JR.
RICHARD E. MCGINNIS &
ROGER W. SHOLLE

BY
ATTORNEYS

United States Patent Office 3,401,497
Patented Sept. 17, 1968

3,401,497
SUPPORT FOR REINFORCING MEMBERS
George E. Gregory, Jr., Rocky River, Richard E. McGinnis, Oberlin, and Roger W. Sholle, Lorain, Ohio, assignors to Gregory Industries, Inc., Lorain, Ohio, a corporation of Michigan
Filed Feb. 26, 1964, Ser. No. 347,460
5 Claims. (Cl. 52—677)

This invention relates to a composite building structure comprising structural metal members and a reinforced concrete body united therewith. The invention is particularly directed to a means to afford temporary support for rod-like reinforcing elements for the concrete body.

Composite structures comprising girders and beams that are made structurally integral with a mass of concrete by the use of shear connector studs are disclosed in the patent to Singleton and McGinnis No. 2,987,855. In this type of construction, shear connector studs are end welded to structural beams, such as to flanges of I-beams, and concrete is poured over the combination. The use of the shear connector studs enables smaller steel beams to be employed and less overall steel to be used in the composite construction, in order to achieve given physical properties. Such studs also can be applied to local areas of the beams to achieve exceptionally high strengths where stresses are greatest.

Frequently, in this type of construction, reinforcing members on rods are used across or along the steel beams to improve the strength even more. Heretofore, such reinforcing members have been tied onto the shear connector studs by hand with wire or the like to hold the reinforcing members in position at least until the concrete is poured. This operation has required a considerable amount of labor which adds to the construction time and is costly. Further, the hand-tied reinforcing members have a tendency to slip and may fall to a position in which the ultimate reinforcing strength is not achieved.

The present invention provides means for temporarily supporting the reinforcing members on the shear connector studs in a composite structure in such a manner that the reinforcing members will be located and held in the exact, desired locations lengthwise of the studs. The invention also provides means whereby the labor of positioning and holding the components in the desired location is all but eliminated, and it is only necessary to lay the reinforcing members in place on previously positioned supports.

It is, therefore, a principal object of the invention to provide a bracket for supporting a reinforcing member or rod from a shear connector stud.

Another object of the invention is to provide a combination of a stud and bracket for supporting a reinforcing member in composite steel and concrete construction.

Other objects and advantages of the invention will be apparent from the following detailed description of a preferred embodiment thereof, reference being made to the accompanying drawing, in which.

Figure 1:
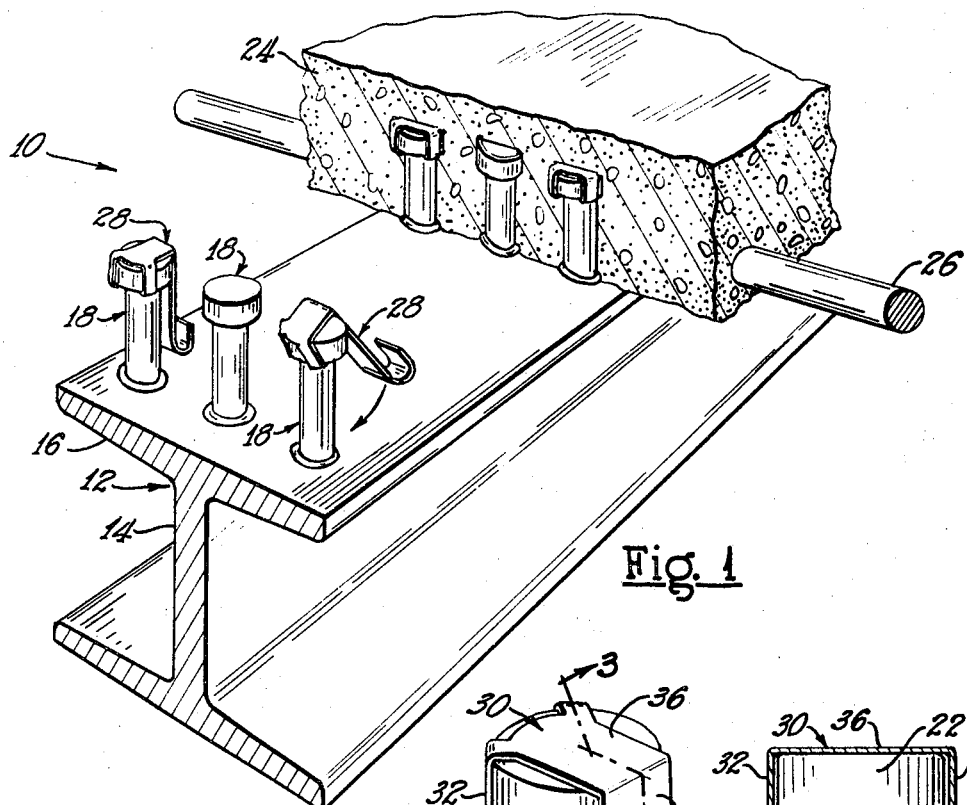
FIG. 1 is a view in perspective of a structural I-beam with a plurality of shear connector studs welded to an upper flange and with brackets for reinforcing members supported on some of the studs according to the invention.

Referring to the drawing and more particularly to FIG. 1, a composite steel and concrete structure is indicated by the reference numeral 10 and includes a suitable beam 12, in this instance an I-beam, having a web 14 and an upper flange 16. A plurality of shear connector studs 18 are welded to the upper surface of the I-beam 12 in a plurality of transverse rows, as shown, or in other suitable locations, as desired. Each of the studs 18 includes a post 20 and an enlarged head 22 with the lower end of the post being end-welded to the flange 16 by the technique described in United States Patent 2,648,748, for example. After the shear connector studs 18 are welded in place, a concrete slab 24 is poured over the beams and over the studs and completely fills in around the studs 18.

Frequently, reinforcing members or rods 26 are used in the construction, either transversely to the beam 12, as shown, or parallel thereto. Where the reinforcing rods 26 are used, heretofore they have been tied to the shear connector studs 18 or to other suitable items by wire or the like. This has involved a substantial amount of time and, consequently, high labor costs. In addition, the hand-tied reinforcing members occasionally would slip while the concrete was being poured, thus moving them to a less than desirable position with maximum strength not being attained. The members also would not always be tied at the ultimate position in the first place so that the maximum amount of strength would not be achieved even though the members did not slip.

To overcome the above difficulties, the invention contemplates the use of a bracket 28 which is designed to fit over the studs 18 where desired to support the reinforcing rods 26. The bracket 28 includes an upper inverted U-shaped connection 30 having a pair of legs 32 at one side of the head 22 and a wide leg 34 at the opposite side connected by a web 36. The use of the two spaced legs 32 help prevent the bracket from slipping off the side of the head 22. Each of the legs 32 has a flange 38 fitting under the head 22 of the shear connector stud and the wide leg 34 has an offset flange 40 fitting under the opposite side of the head 22 of the stud. Below the offset flange 40 is a shank 42 of predetermined length and an upright, U-shaped hook 44 integral with the lower end of the shank 42 and forming a positioning or supporting means for the reinforcing rod 26. The hook 44 also has a reinforcing rib 46 formed in the metal for greater strength. The length of the shank 42 can be varied to change the position of the rod 26 relative to the flange 16 and also to accommodate different stud lengths. Once the rod 22 is placed in the hook, however, it is properly positioned with virtually no chance of slipping or shifting. The U-shaped connection 30 also can be of different sizes to accommodate different size studs, although the diameter of the head 20 of the stud 18 usually is quite uniform.

Figures 2, 3:
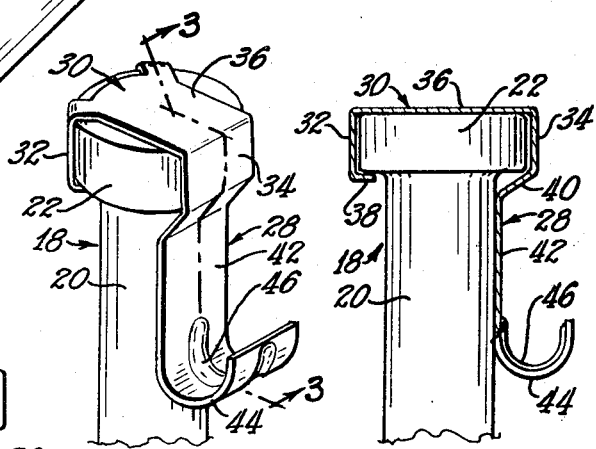
FIG. 2 is an enlarged, fragmentary view in perspective of a shear connector stud and a reinforcing member bracket shown in FIG. 1.
FIG. 3 is a fragmentary view in elevation of the shear connector stud and the reinforcing member bracket in cross section, taken along the line 3—3 of FIG. 2.

The bracket 28 can be attached quickly to the shear connector stud 18, in a fraction of the amount of time required to tie the rod 26 to one of the studs 18. To accomplish this, the bracket 28 is placed at an angle with the end flange 38 positioned under the head 24 as shown in FIG. 1. The bracket 28 is then swung downwardly in a clockwise direction as viewed in FIGS. 2 and 3 and as indicated by the arrow in FIG. 1 until the opposite offset flange 40 swings under the opposite side of the head 20.

The bracket 28 thereby is held firmly in place ready to receive the reinforcing rod 26 in the hook 44.

Figure 4:
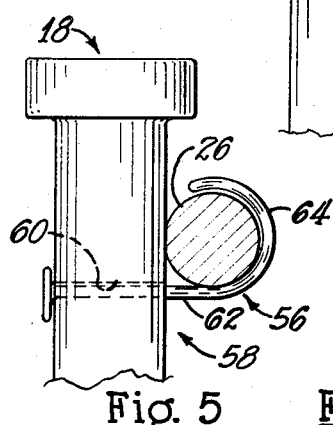
FIG. 4 is a view in perspective of a shear connector stud used with a modified bracket.

A modified reinforcing rod bracket 48 is shown in FIG. 4. In this instance, the bracket 48 simply includes a shank 50 and a reinforcing member hook or holding means 52 located along the post 20 of the stud 18 in the same general position as the hook 44 of the bracket 28. In this instance, the shank 50 is spot-welded at 54 to the post 20 with this weld constituting the means for attaching the bracket 48 to the stud 18. The combined stud 18 and bracket 48 can be preassembled and then welded to the flange 16 of the beam 12 wherever desired. In this instance, the bracket 48 is ready to receive the reinforcing rod 26 as soon as the stud 18 is welded in place, with no additional operation required. However, the welding of the shank 50 to the post 20 is an extra operation which adds to the cost of the assembly.

Figures 5, 6:
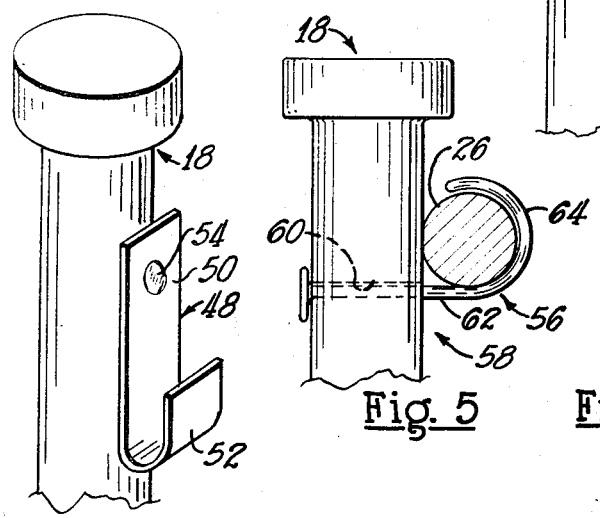
FIG. 5 is a view in elevation of a modified shear connector stud and a further modified bracket.
FIG. 6 is a fragmentary view in elevation similar to FIG. 3 of a shear connector stud and a modified reinforcing member bracket in cross section.

Another modified bracket 56, generally in the shape of a nail, is shown in FIG. 5, assembled with a modified stud 58. The stud 58 is the same as the stud 18 except that a hole 60 is formed therein, preferably when the stud is manufactured. After the stud is welded in place, a shank 62 of the bracket 56 is pushed through the passage 60 and has an outer end portion bent upwardly to form a hook or rod holding means 64 to receive the rod 26. A head 66 on the opposite end of the shank 62 prevents the bracket from passing entirely through the passage 60. While the bracket 56 is simpler and of lower cost than the prior brackets, the passage 60 in the stud 58 requires an additional operation which adds to the cost of the stud.

Another modified bracket 68 is shown in FIG. 6 and is specifically designed to position or hold the reinforcing bar 26 on top of the shear connector stud 18. This bracket 68 can be used with thicker concrete slabs when it is advantageous to place the reinforcing bars 26 in higher positions with respect to the studs. In this instance, the weight of the bar 26 is taken on the stud 18 but the bracket 68 still positions the bar 26 and holds it with respect to the head 22 of the stud 18. For this purpose, the bracket 68 includes legs 70 and 72 having flanges 74 and 76 fitting under the stud head 22 to hold the bracket in place. The bracket 68 also includes a U-shaped portion 78 which constitutes positioning or holding means for the bar 26. The brackets can also be suitably modified to hold the reinforcing bar 26 above the studs, if desired.

Various modifications of the above-described embodiments of the invention will be apparent to those skilled in the art, and it is to be understood that such modifications can be made without departing from the scope of the invention, if they are within the spirit and the tenor of the accompanying claims.

What we claim is:

1. In combination, a shear connector stud having a post and an enlarged head, a bracket mounted on said shear connector stud for supporting a reinforcing member thereon, said bracket comprising a generally inverted U-shaped connection having a web extending over the top of said head and having legs extending downwardly on generally opposite sides of said head, one of said legs having a flange extending inwardly under said head and the other leg having an offset flange extending inwardly under said head, a shank extending downwardly from said offset flange and integral therewith, and a hook integral with said shank and positioned to receive a reinforcing member alongside said post of said shear connector stud.

2. In combination, a shear connector stud having a post and an enlarged, cylindrical head, a bracket mounted on said shear connector stud for supporting a reinforcing member thereon, said bracket comprising a generally inverted U-shaped connection having a web extending across the top of said head, a pair of spaced legs integral with said web and extending downwardly alongside said head, and a wide leg integral with said web and extending downwardly along said head, said spaced legs and said wide leg providing three points of engagement of said bracket with said head of said shear connector stud, a shank extending downwardly from said wide leg and integrally connected therewith, and a hook integral with said shank and positioned to receive a reinforcing member alongside said post of said shear connector stud.

3. In combination, a shear connector stud having a post and an enlarged head, a bracket affixed to said shear connector stud for supporting a reinforcing member thereon, said bracket comprising a shank, an upper portion of said shank being welded to an intermediate portion of said post below said head, said shank extending downwardly alongside said post, and a reinforcing member hook integral with said shank and positioned to receive a reinforcing member along said post of said shear connector stud.

4. In combination, a shear connector stud having a post and an enlarged head, said post having a passage extending transversely completely therethrough below said head, a bracket mounted on said shear connector stud for supporting a reinforcing member thereon, said bracket comprising a shank extending completely through said passage and having a head on one end located adjacent said post of said shear connector stud, the other end of said shank extending beyond said post and being bent to form a hook portion for receiving a reinforcing member alongside said post of said shear connector stud.

5. In combination, a shear connector stud having a post and an enlarged head, a bracket mounted on said shear connector stud for supporting a reinforcing member thereon, said bracket comprising a pair of legs on generally opposite sides of said head of said shear connector stud and extending downwardly, said legs having flanges fitting under the stud head to hold the bracket in place, said bracket further having an intermediate U-shaped portion integral with said legs and located on top of said head, said U-shaped portion being of a size to receive and hold a reinforcing member on top of said head.

References Cited

UNITED STATES PATENTS

| 1,362,188 | 12/1920 | Richardson et al. | 52—653 |
| 1,742,883 | 1/1930 | Venzie | 52—701 |
| 2,271,592 | 2/1942 | Hilpert | 52—334 |
| 2,436,533 | 2/1948 | Thompson | 248—301 |
| 2,437,535 | 3/1948 | Jenkins | 248—301 |
| 3,224,715 | 12/1965 | Maggiore | 248—301 |

FOREIGN PATENTS 521,597  3/1931  Germany.

OTHER REFERENCES

Engineering News-Record, Aug. 20, 1959, pp. 44–47, Scientific Library Call No. Ta–1–E61.

HENRY C. SUTHERLAND, *Primary Examiner.*

JAMES L. RIDGILL, *Assistant Examiner.*